(12) United States Patent
Li

(10) Patent No.: US 9,727,240 B2
(45) Date of Patent: Aug. 8, 2017

(54) DATA ERASABLE METHOD OF MEMORY IN SMART CARD AND SMART CARD THEREOF

(75) Inventor: Lin Li, Beijing (CN)

(73) Assignee: CHINA MOBILE COMMUNICATIONS CORPORATION, Beijing (CN)

(*) Notice: Subject to any disclaimer, the term of this patent is extended or adjusted under 35 U.S.C. 154(b) by 478 days.

(21) Appl. No.: 13/823,744

(22) PCT Filed: Sep. 16, 2011

(86) PCT No.: PCT/CN2011/079714
§ 371 (c)(1),
(2), (4) Date: May 27, 2013

(87) PCT Pub. No.: WO2012/034531
PCT Pub. Date: Mar. 22, 2012

(65) Prior Publication Data
US 2014/0149642 A1 May 29, 2014

(30) Foreign Application Priority Data
Sep. 17, 2010 (CN) .......................... 2010 1 0286121

(51) Int. Cl.
*G06F 12/00* (2006.01)
*G06F 3/06* (2006.01)
(Continued)

(52) U.S. Cl.
CPC .......... *G06F 3/0604* (2013.01); *G06F 1/3225* (2013.01); *G06F 3/0655* (2013.01);
(Continued)

(58) Field of Classification Search
CPC .... G06F 3/0655; G06F 3/0679; G06F 3/0604; G06F 2212/177; G06F 2212/7203;
(Continued)

(56) References Cited

U.S. PATENT DOCUMENTS 5,247,164 A * 9/1993 Takahashi ............ G06K 7/0008
235/380
5,410,714 A * 4/1995 Yorimoto ............... G06K 19/07
235/380

(Continued)

FOREIGN PATENT DOCUMENTS

CN 101650972 A 2/2010

*Primary Examiner* — David X Yi
*Assistant Examiner* — Francisco Grullon
(74) *Attorney, Agent, or Firm* — Kilpatrick Townsend & Stockton LLP

(57) ABSTRACT

The invention relates to a data erasable method of memory in smart cards and smart cards thereof, which includes: when a CPU in the smart card determines a data erasable operation will be proceed in the specified memory of the smart card, cache the data to be written in a random memory cache of the specified memory; after sending a data erasable signal to the specified memory, control itself to enter a standby sleep mode. The data erasable signal is used to indicate the specified memory to process the data erasable operation by obtaining the data to be written from the random memory cache. Using the provided solution, the current of the machine card interface can be reduced when a data erasable is proceed in the specified memory of the smart card, thus abnormal conditions due to the high current of the machine card interface are avoided, and the power consumption is reduced at the same time, the standby time of the device which the smart card is in is improved.

8 Claims, 3 Drawing Sheets

(51) Int. Cl.
*G06F 12/02* (2006.01)
*G06F 1/32* (2006.01)

(52) U.S. Cl.
CPC ........ *G06F 3/0679* (2013.01); *G06F 12/0246* (2013.01); *G06F 2212/1028* (2013.01); *G06F 2212/177* (2013.01); *G06F 2212/7203* (2013.01); *Y02B 60/1225* (2013.01)

(58) Field of Classification Search
CPC ........ G06F 2212/1028; G06F 12/0246; G06K 7/00; Y02B 60/1225
See application file for complete search history.

(56) References Cited

U.S. PATENT DOCUMENTS

| | | | | |
|---|---|---|---|---|
| 6,465,818 | B1* | 10/2002 | Kato | G11C 8/12 |
| | | | | 257/202 |
| 7,002,853 | B2* | 2/2006 | Kozakai | G06F 3/0614 |
| | | | | 365/185.05 |
| 8,055,828 | B2* | 11/2011 | Conti et al. | 710/267 |
| 2003/0028699 | A1* | 2/2003 | Holtzman et al. | 710/301 |
| 2004/0225799 | A1* | 11/2004 | Leaming | 710/301 |
| 2005/0177712 | A1* | 8/2005 | Kadi | H04W 28/14 |
| | | | | 713/150 |
| 2007/0079161 | A1* | 4/2007 | Gupta | 713/324 |
| 2008/0043562 | A1* | 2/2008 | Totolos et al. | 365/227 |
| 2008/0148083 | A1* | 6/2008 | Pesavento et al. | 713/322 |
| 2008/0195875 | A1* | 8/2008 | Hobson | 713/320 |
| 2009/0172257 | A1* | 7/2009 | Prins et al. | 711/103 |
| 2009/0172263 | A1* | 7/2009 | Olbrich | G06F 13/1657 |
| | | | | 711/103 |

* cited by examiner

DATA ERASABLE METHOD OF MEMORY IN SMART CARD AND SMART CARD THEREOF

This application claims the benefit of Chinese Patent Application No. 201010286121.9, filed with the Chinese Patent Office on Sep. 17, 2010 and entitled "Method of Erasing and Writing Data from and to Memory in Smart Card and Smart Card", which is hereby incorporated by reference in its entirety.

FIELD

The present invention relates to the field of a smart card and particularly to a method of erasing and writing data from and to a memory in a smart card and a smart card.

BACKGROUND

In recent years, a large-capacity smart card has been developed along with higher requirements on an operating speed, a capacity and an interface speed of a smart card as well as the use of the smart card to provide a user with a more variety of services. As compared with a normal smart card, the large-capacity smart card has its CPU (Central Processing Unit), RAM (Random Access Memory). EEPROM (Electrically Erasable Programmable Read-Only Memory), counter and secured processing device unchanged and also the roles and locations of its profile and pins unchanged except an extra large-capacity Flash memory in addition to the original smart card chip, e.g., a nonvolatile NAND flash memory or a nonvolatile NOR flash memory for storage of codes and data.

The NOR flash memory and the NAND flash memory are two predominant types of nonvolatile flash memories at present. The NOR flash memory is characterized by XIP (eXecute In Place) where an application can be run directly in the flash memory without fetching codes into a system RAM. The NOR flash memory is efficient with transmission and has a very high cost benefit with a capacity of 1 to 4 MB but has its performance degraded by lower writing and erasing speeds. The NAND flash memory can offer an extremely high density of elements and reach a high storage density and also has high writing and erasing speeds but suffers from a drawback of its application arising from a special system interface required for management of the flash memory.

Both the NOR flash memory and the NAND flash memory are characterized by their large capacities and thus currently have been widely used in large-capacity smart cards, generally in a digital electronic product, an SD card (Secure Digital Memory Card), an SIM (Subscriber Identity Module) card inside a mobile phone terminal, etc., to provide effectively these devices with a sufficient storage capacity available to various applications, data, files, etc.

At present, a device-card interface between the smart card in use and the device where the smart card is located is at a voltage typically in support of three levels, 5V, 3V and 1.8V respectively, corresponding to three levels of voltage, and also carries limited current. Taking the SIM card in the mobile phone terminal as an example, the device-card interface of the mobile phone terminal to the SIM card carries current of no more than 15 mA, or 20 mA taking some redundancy into account, under a normal operating condition, and the mobile phone terminal may get abnormal with the current of the device-card interface going beyond the limit, for example, the mobile phone may be forced to be powered off so as to be protected against an abnormality attack.

However for the large-capacity smart card, the current of the device-card interface may be larger than that of the normal smart card due to the characteristic of performing a data erasing and writing operation on the large-capacity memory therein, and results of a test in which 1-byte random numbers were written into the NAND flash memory in the smart card in an Update Binary instruction by way of example showed that the average spike current of the device-card interface reached 23 mA while erasing and writing the data from and to the NAND flash memory, the current of the device-card interface ranged from 6 mA to 10 mA while running another application instead of erasing and writing the data from and to the NAND flash memory, and the current of the device-card interface was approximately 2 mA while the smart card was idle. As can be apparent from the results of the test, the current of the device-card interface was beyond the normal current range while performing the data erasing and writing operation on the NAND flash memory so that the mobile phone terminal became abnormal, and such significant current also had more battery power of the mobile phone terminal consumed and hence a standby period of time of the mobile phone terminal shortened.

SUMMARY

Embodiments of the invention provide a method of erasing and writing data from and to a memory in a smart card and a smart card so as to lower current of a device-card interface while erasing and writing data from and to a specified memory in a smart card and further avoid an abnormality occurring due to over-current of the device-card interface.

An embodiment of the invention provides a method of erasing and writing data from and to a memory in a smart card, which includes:

a Central Processing Unit, CPU, in the smart card, buffering data to be written into a random memory buffer of a specified memory in the smart card upon determining a data erasing and writing operation to be performed on the specified memory; and controlling itself to enter a standby and sleep mode after transmitting a data erasing and writing signal to the specified memory, wherein the data erasing and writing signal instructs the specified memory to perform the data erasing and writing operation by acquiring the data to be written from the random memory buffer.

An embodiment of the invention further provides a smart card including a CPU and a memory, wherein:

the CPU is configured to buffer data to be written into a random memory buffer of the memory upon determining a data erasing and writing operation to be performed on the memory; and to control itself to enter a standby and sleep mode after transmitting a data erasing and writing signal to the memory; and the memory is configured to perform the data erasing and writing operation by acquiring the data to be written from the random memory buffer upon reception of the data erasing and writing signal.

In the method according to the embodiment of the invention, the CPU firstly buffers data to be written into the random memory buffer of the specified memory in the smart card upon determining the data erasing and writing operation to be performed on the specified memory and controls itself to enter a standby and sleep mode after transmitting a data erasing and writing signal to the specified memory, where the data erasing and writing signal instructs the specified memory to perform the data erasing and writing operation by acquiring the data to be written from the random memory buffer. Since the CPU has entered the standby and sleep mode, that is, has stopped its processing operation, while the specified memory performs the data erasing and writing operation, current of a device-card interface at this time includes only current generated for the specified memory to perform the data erasing and writing operation, and thus current generated for the CPU to perform a processing operation and also the current of the device-card interface can be lowered as compared with the prior art to thereby avoid an abnormality occurring due to over-current of the device-card interface and also lower power consumption due to the lowered current and hence improve a standby period of time of a device where the smart card is located.

DETAILED DESCRIPTION OF THE EMBODIMENTS

In order to provide a solution to lowering current of a device-card interface while erasing and writing data from and to a specified memory in a smart card and further avoiding an abnormality occurring due to over-current of the device-card interface, embodiments of the invention provide a method of erasing and writing data from and to a memory in a smart card and a smart card, and preferred embodiments of the invention will be described below with reference to the drawings. It shall be appreciated that the preferred embodiments described below are merely intended to illustrate and explain but not to limit the invention. The embodiments of the invention and features in the embodiments can be combined with each other given no confliction.

Figure 1:
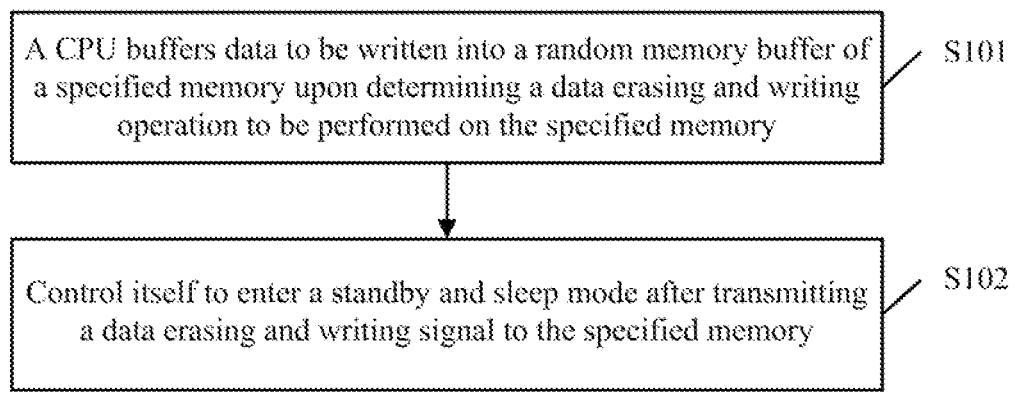
FIG. 1 is a flow chart of a method of erasing and writing data from and to a memory in a smart card according to an embodiment of the invention.

An embodiment of the invention provides a method of erasing and writing data from and to a memory in a smart card, as illustrated in FIG. 1, which includes:

Step S101. A CPU in the smart card buffers data to be written into a random memory buffer of a specified memory in the smart card upon determining a data erasing and writing operation to be performed on the specified memory.

Step S102. The CPU controls itself to enter a standby and sleep mode after transmitting a data erasing and writing signal to the specified memory, where the data erasing and writing signal instructs the specified memory to perform the data erasing and writing operation by acquiring the data to be written from the random memory buffer.

The foregoing method may further include:

The CPU controls itself to enter a normal operating mode from the standby and sleep mode after the specified memory performs the data erasing and writing operation.

The method and apparatus according to the invention will be described below in details in particular embodiments thereof.

First Embodiment

Figure 2:
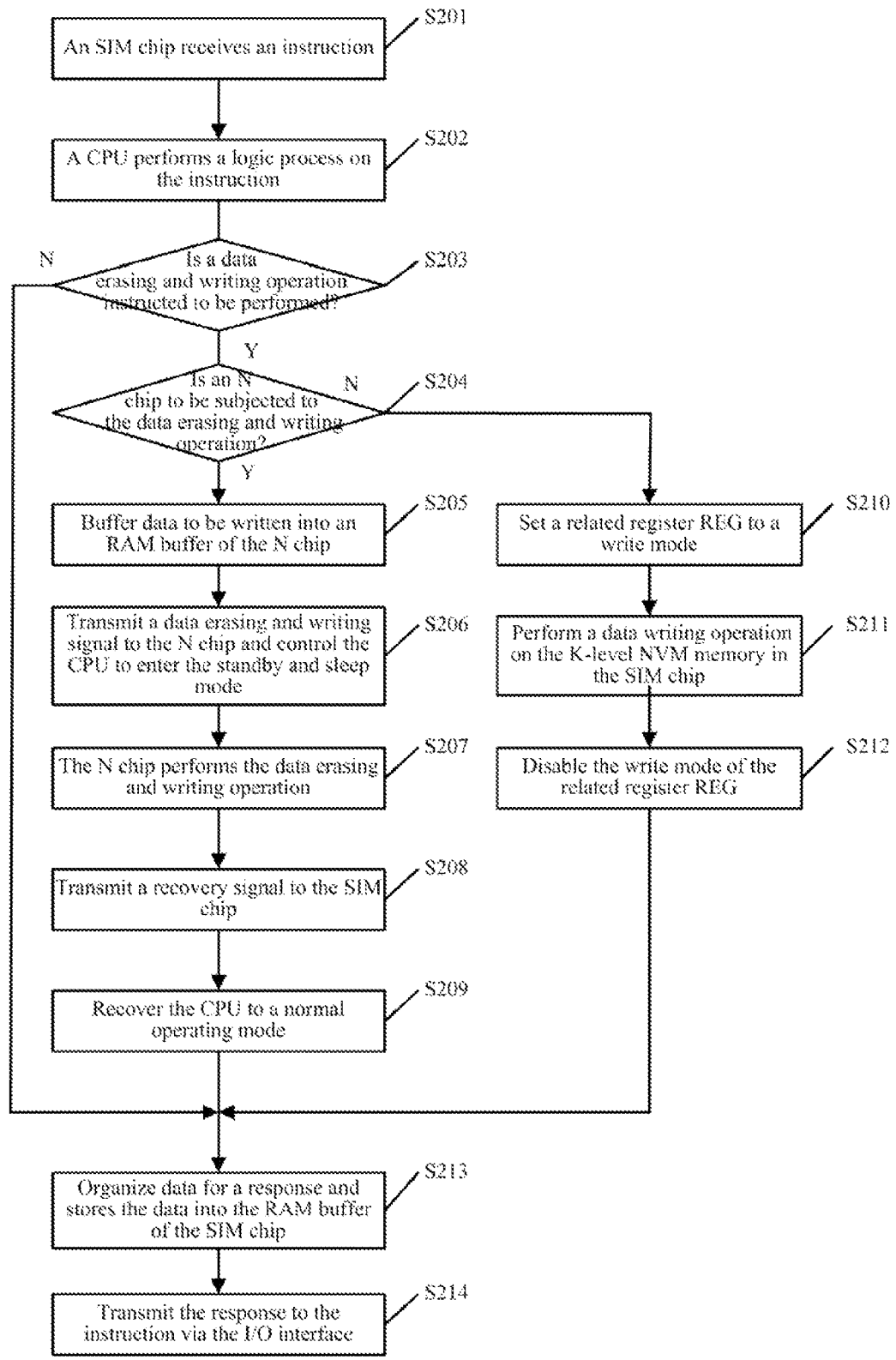
FIG. 2 is a flow chart of a method of erasing and writing data from and to a memory in a smart card according to a first embodiment of the invention.

In the first embodiment of the invention, a flow of performing a data erasing and writing operation on a memory in an SIM card used in a mobile phone terminal will be described in details by way of example, and as illustrated in FIG. 2, the flow includes:

Step S201. An SIM chip in the SIM card receives an instruction transmitted from the terminal where the SIM card is located via an I/O interface in the SIM card.

Step S202. A CPU in the SIM chip performs a logic process on the received instruction according to a preset processing strategy to determine an operation instructed by the instruction.

Step S203. The flow proceeds to the step S204 when the instruction instructs a data erasing and writing operation to be performed on the memory in the SIM card; otherwise, the flow proceeds to the step S213.

Step S204. It is determined whether the memory to be subjected to the data erasing and writing operation is an M-level large-capacity memory, and if so, then the flow proceeds to the step S205; otherwise, the data erasing and writing operation is to be performed on a K-level nonvolatile NVM memory embedded in the SIM chip, and the flow goes to the step S210.

In embodiments of the invention, for a large-capacity memory, an NAND flash memory or an NOR flash memory can be used and will be referred collectively as an N chip for the sake of a convenient description.

Step S205, the CPU in the SIM chip acquires data to be written according to the received instruction and buffers the data to be written into a random memory buffer, RAM buffer, of the N chip so that when the CPU subsequently enters a standby and sleep mode, the N chip can acquire the data to be written from its own RAM buffer without the need of the CPU to control in real time transmission of the data to be written to the N chip.

Step S206. The SIM chip transmits a data erasing and writing signal to the N chip and controls the CPU to enter the standby and sleep mode.

The transmitted data erasing and writing signal may be transmitted as an interruption signal.

Step S207. The N chip performs the data erasing and writing operation by acquiring the data to be written from its own RAM buffer upon reception of the data erasing and writing signal transmitted from the SIM chip, possibly particularly as follows:

The N chip erases data stored in its own corresponding area, acquires the data to be written from its own RAM buffer and writes the data to be written into the corresponding area to thereby perform the data erasing and writing operation.

The CPU is in the standby and sleep mode all the time throughout the process of the N chip to perform the data erasing and writing operation.

Step S208. The N chip transmits a recovery signal to the SIM chip after performing the data erasing and writing operation, where the recovery signal instructs the CPU to enter a normal operating mode from the standby and sleep mode, and also the N chip stops operating.

The transmitted recovery signal may be transmitted as an interruption signal.

Step S209. The SIM chip controls the CPU to enter the normal operating mode from the standby and sleep mode upon reception of the recovery signal.

Step S210. The CPU in the SIM chip sets a register (REG) related to the data erasing and writing operation on the K-level NVM memory to a write mode.

Step S211. The CPU acquires the data to be written and writes the data to be written cyclically into a corresponding area of the K-level NVM memory in the SIM chip.

Step S212. The CPU disables the write mode of the related register REG after the data writing operation is performed on the K-level NVM memory in the SIM chip.

Step S213. The CPU in the SIM chip organizes data for a response and stores the data into the RAM buffer of the SIM chip according to a result of performing the operation instructed by the received instruction.

Step S214. The SIM chip transmits the response to the instruction via the I/O interface to finish a response process to the instruction.

In the method according to the foregoing first embodiment, all the operations performed by the SIM chip and the N chip can be performed by logic control performed with COS (Chip Operating System) software of the SIM chip.

With the process flow according to the foregoing first embodiment, when the data erasing and writing operation is performed on the N chip, the CPU is in the standby and sleep mode in which no related processing operation is performed, so current generated at this time includes only current generated for N chip to perform the data erasing and writing operation, and thus the current of the device-card interface can be lowered as compared with the prior art to thereby avoid an abnormality occurring due to over-current of the device-card interface and also lower power consumption and hence improve a standby period of time of the mobile phone terminal where the SIM card is located.

In the foregoing first embodiment, the smart card being an SIM card and the large-capacity memory being an NAND flash memory or an NOR flash memory have been taken as an example, and for other smart cards including large-capacity memories, a data erasing and writing operation can be performed on the large-capacity memories in a similar processing way as in the first embodiment to lower current of device-card interfaces.

Second Embodiment

Figure 3:
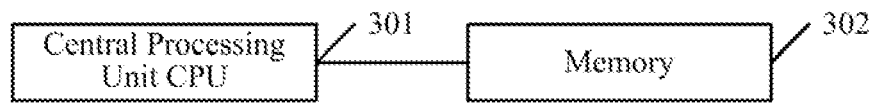
FIG. 3 is a schematic structural diagram of a smart card according to a second embodiment of the invention.

Based upon the same inventive idea, following the method for erasing and writing data from and to a memory in a smart card according to the embodiment of the invention, another embodiment of the invention further provides a smart card structured as illustrated in the schematic diagram of FIG. 3, which includes a Central Processing Unit (CPU) 310 and a memory 302, where:

The CPU 301 is configured to buffer data to be written into a random memory buffer of the memory 302 upon determining a data erasing and writing operation to be performed on the memory 302; and to control itself to enter a standby and sleep mode after transmitting a data erasing and writing signal to the memory 302; and The memory 302 is particularly configured to perform the data erasing and writing operation by acquiring the data to be written from its own random memory buffer upon reception of the data erasing and writing signal.

Preferably the CPU 301 is further configured to control itself to enter a normal operating mode from the standby and sleep mode after the memory 302 performs the data erasing and writing operation.

Preferably the memory 302 is further configured to transmit a recovery signal to the CPU 301 after performing the data erasing and writing operation; and The CPU 301 is particularly configured to control itself to enter the normal operating mode from the standby and sleep mode according to an instruction of the received recovery signal.

Preferably the CPU 301 is particularly configured to transmit the data erasing and writing signal as an interruption signal; and/or The memory 302 is particularly configured to transmit the recovery signal as an interruption signal.

Preferably the memory 302 is an NAND flash memory or an NOR flash memory.

In summary, in the solution according to the embodiments of the invention, a CPU in a smart card buffers data to be written into a random memory buffer of a specified memory in the smart card upon determining a data erasing and writing operation to be performed on the specified memory and controls itself to enter a standby and sleep mode after transmitting a data erasing and writing signal to the specified memory, where the data erasing and writing signal instructs the specified memory to perform the data erasing and writing operation by acquiring the data to be written from the random memory buffer. With the solution according to the embodiments of the invention, current of a device-card interface while erasing and writing data from and to the specified memory in the smart card can be lowered to thereby avoid an abnormality occurring due to over-current of the device-card interface and also lower power consumption and hence improve a standby period of time of a device where the SIM card is located.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method of erasing and writing data from and to a memory in a smart card, comprising:
    a Central Processing Unit, CPU, in the smart card, buffering data to be written into a random memory buffer of a specified memory in the smart card upon determining a data erasing and writing operation to be performed on the specified memory; and
    the CPU entering a standby and sleep mode after transmitting a data erasing and writing signal to the specified memory, wherein the data erasing and writing signal instructs the specified memory to perform the data erasing and writing operation by acquiring the data to be written from the random memory buffer;
    wherein the CPU has entered the standby and sleep mode while the specified memory performs the data erasing and writing operation;
    wherein the method further comprises:
    the CPU receiving a recovery signal transmitted from the specified memory after the data erasing and writing operation; and
    the CPU entering a normal operating mode from the standby and sleep mode according to an instruction of the recovery signal after the specified memory performs the data erasing and writing operation.

2. The method according to claim 1, wherein the data erasing and writing signal and/or the recovery signal are/is interruption signals and/or an interruption signal.

3. The method according to claim 1, wherein the specified memory is a nonvolatile NAND flash memory or a nonvolatile NOR flash memory.

4. A smart card, comprising a Central Processing Unit, CPU, and a memory, wherein:
    the CPU is configured to buffer data to be written into a random memory buffer of the memory upon determining a data erasing and writing operation to be performed on the memory; and to enter a standby and sleep mode after transmitting a data erasing and writing signal to the memory; and
    the memory is configured to perform the data erasing and writing operation by acquiring the data to be written from the random memory buffer upon reception of the data erasing and writing signal;
    wherein the CPU has entered the standby and sleep mode while the memory performs the data erasing and writing operation;
    wherein the memory is further configured to transmit a recovery signal to the CPU after performing the data erasing and writing operation; and
    the CPU is further configured to enter a normal operating mode from the standby and sleep mode after the memory performs the data erasing and writing operation according to an instruction of the recovery signal received.

5. The smart card according to claim 4, wherein the CPU is configured to transmit the data erasing and writing signal as an interruption signal; and/or
    the memory is configured to transmit the recovery signal as an interruption signal.

6. The smart card according to claim 4, wherein the memory is a nonvolatile NAND flash memory or a nonvolatile NOR flash memory.

7. The method according to claim 2, wherein the specified memory is a nonvolatile NAND flash memory or a nonvolatile NOR flash memory.

8. The smart card according to claim 5, wherein the memory is a nonvolatile NAND flash memory or a nonvolatile NOR flash memory.

* * * * *